United States Patent
Maehata et al.

(10) Patent No.: US 6,426,474 B1
(45) Date of Patent: Jul. 30, 2002

(54) METHOD AND APPARATUS FOR SEPARATING PLASTIC

(75) Inventors: Hidehiko Maehata; Tetsuya Inoue; Hiroaki Arai; Masanori Tsukahara; Daisuke Tamakoshi; Kenichi Nagai, all of Osaka (JP)

(73) Assignee: Hitachi Zosen Corporation (JP)

( * ) Notice: Subject to any disclaimer, the term of this patent is extended or adjusted under 35 U.S.C. 154(b) by 0 days.

(21) Appl. No.: 09/744,366

(22) PCT Filed: Dec. 17, 1999

(86) PCT No.: PCT/JP99/07128
§ 371 (c)(1),
(2), (4) Date: Jan. 23, 2001

(87) PCT Pub. No.: WO00/76669
PCT Pub. Date: Dec. 21, 2000

(30) Foreign Application Priority Data

Jun. 11, 1999 (JP) .............................. 11-164535

(51) Int. Cl.$^7$ .............................. B03C 7/00; B03C 7/06
(52) U.S. Cl. ...................................... 209/127.1; 209/129
(58) Field of Search ........................ 209/3, 127.1, 128, 209/129, 130, 127.3, 127.4

(56) References Cited

U.S. PATENT DOCUMENTS

| | | | |
|---|---|---|---|
| 2,737,248 A | * 3/1956 | Roberts ........................ 241/24 |
| 5,118,407 A | * 6/1992 | Beck et al. ..................... 209/2 |
| 5,289,922 A | * 3/1994 | Inculet et al. ............. 209/127.1 |
| 5,370,235 A | * 12/1994 | Stahl et al. .............. 209/127.4 |
| 5,746,320 A | * 5/1998 | Fujita et al. ............. 209/127.3 |
| 6,034,342 A | * 3/2000 | Schmoutziguer et al. 209/127.1 |

FOREIGN PATENT DOCUMENTS

| | | | |
|---|---|---|---|
| JP | 07178351 A | | 7/1995 |
| JP | 09094482 A | | 4/1997 |
| JP | 09299829 A | | 11/1997 |
| JP | 09299830 A | | 11/1997 |
| JP | 2000126650 A | * | 5/2000 |
| WO | WO 00/2919 | * | 5/2000 |

* cited by examiner

Primary Examiner—Donald P. Walsh
Assistant Examiner—Joseph Rodriguez
(74) Attorney, Agent, or Firm—Mark Kusner; Michael A. Jaffe (57) ABSTRACT

The invention provides a plastic sorting method and apparatus, which, when plastic pieces comprising a plurality of types of resin plastics are agitated and frictionally charged, are able to impart the plastic pieces a necessary amount of charge or polarity for the thorough separation even if the difference in the amount of the different types of plastic pieces is large and to increase the recovery rate. If the amount of a specified type plastic pieces (1) to be recovered is small, the agitation and the electrostatic separation is carried out after adding the specified type plastic pieces (1) as auxiliary frictional charging material (21) into the frictional charging device (3), and the auxiliary frictional charging material (21) remains in the frictional charging device (3) and is used repeatedly.

2 Claims, 6 Drawing Sheets

FIG. 1

(PRIOR ART)

METHOD AND APPARATUS FOR SEPARATING PLASTIC

TECHNICAL FIELD

The present invention relates to a plastic sorting method and a plastic sorting apparatus for sorting, according to type, crushed waste composed of mixed plastic pieces of a plurality of types.

BACKGROUND ART

In recent years, recycling of waste has proceeded tremendously. Among different plastics that are consumed as raw material for plastic articles, polyvinyl chloride resins (hereinafter referred to as "PVC"), polyethylene resins (hereinafter referred to as "PE"), polypropylene resins (hereinafter referred to as "PP"), polystyrene resins (hereinafter referred to as "PS"), and methacrylic resins [acrylic resins] (hereinafter referred to as "PMMA") account for about 80%, and these types of resins account for almost all the plastic waste that is recovered. Also polyethylene-terephthalate resin (hereinafter referred to as "PET"), which is used in so-called PET bottles, is increasingly collected individually. When these resins are recycled, it is indispensable to classify (sort) them by resin type.

Figure 1:
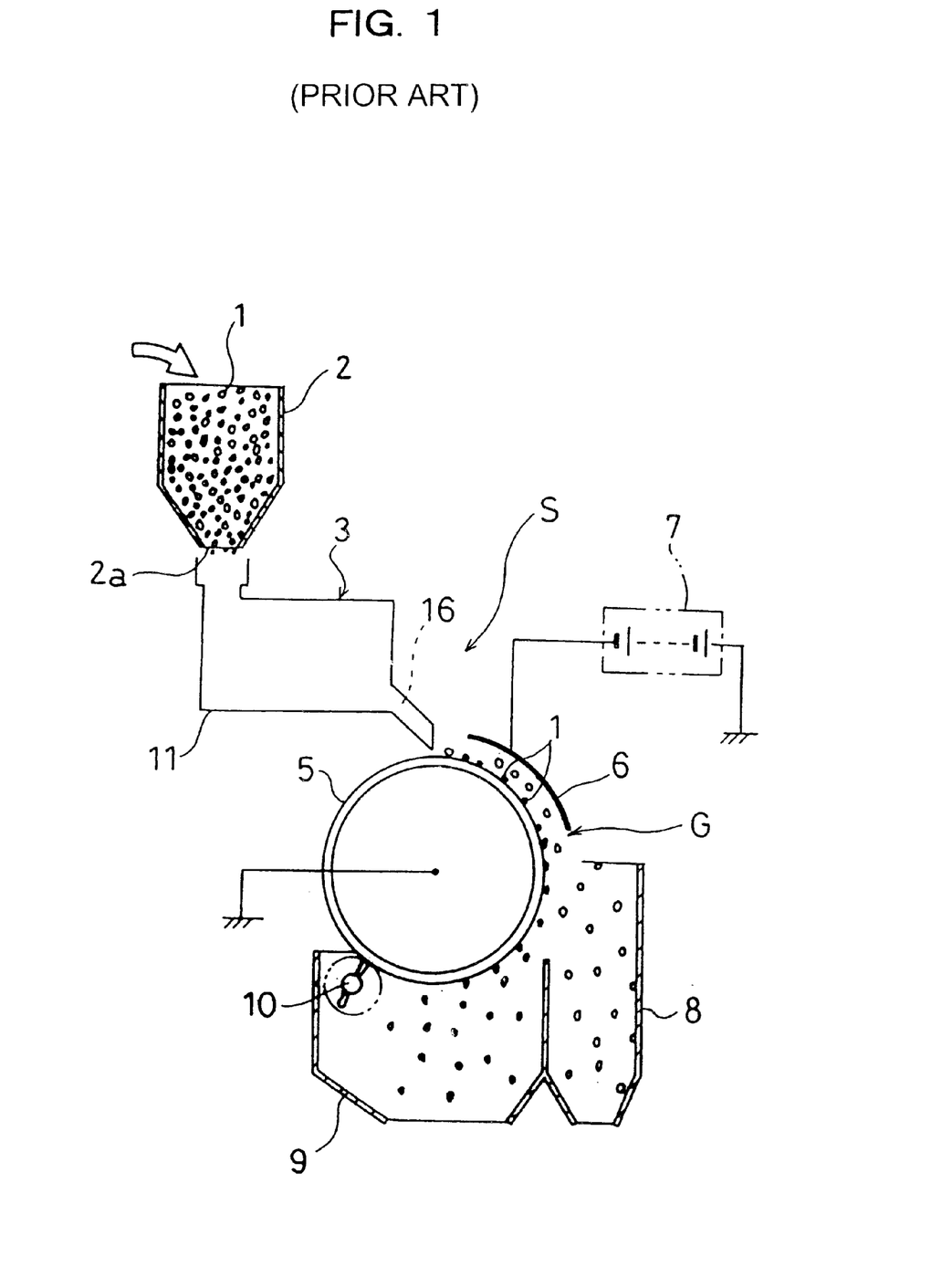
FIG. 1 is a schematic diagram showing a general configuration of a plastic sorting apparatus according to a first embodiment of the present invention.

Conventionally, an apparatus for sorting plastic pieces, using charging properties of the plastic pieces has been provide as a technology for sorting crushed plastic pieces. Such a conventional plastic sorting apparatus is explained with reference to FIG. 1 showing a general configuration of a plastic sorting apparatus in accordance with a first embodiment of the present invention.

In this plastic sorting apparatus S, plastic pieces 1 of various different types of resins, or crushed waste to be sorted, are introduced in a mixed state into a hopper 2. A mixture of resin plastic pieces 1 of different types is supplied from an outlet port of the hopper 2 into a frictional charging device 3, the plastic pieces 1 are frictionally charged by agitating them in this frictional charging device 3, and then they are distributed over an upper surface of a metal drum electrode 5. The metal drum electrode 5 is rotatable in a predetermined direction around a horizontal axis and is grounded.

An arcuate plate-shaped high-voltage electrode 6 is arranged in a rotational direction diagonally above the metal drum electrode 5. A pole, for example a negative pole, of a high-voltage power source 7 is connected to the high-voltage electrode 6, whereas a positive pole of the high-voltage power source 7 is grounded. Being thus connected, the metal drum electrode 5 forms a rotating grounded electrode, and an electrostatic field for sorting is generated between the high-voltage electrode 6 and the metal drum electrode 5.

Below the metal drum electrode 5, a first separation container 8 and a second separation container 9, which are open upward, are arranged sequentially on the upstream side in the rotational direction. A brush 10 for scraping off plastic pieces 1 that adhere to the peripheral surface of the metal drum electrode 5 is disposed on the outer periphery of the metal drum electrode 5.

The following explains how this configuration operates. Various types of plastic pieces 1 are introduced-in a mixed state into the frictional charging device 3 from the hopper 2. Inside the cylinder of the frictional charging device 3, different types of plastic pieces 1 are agitated and rubbed against one another so that frictional charging of the plastic pieces is effected depending on a polarity and amount of electric charge for each plastic piece. Then, the charged plastic pieces 1 are scattered over the metal drum electrode 5. The plastic pieces 1 that have been charged with a negative charge in the frictional charging device 3 are repelled by the high-voltage electrode 6 and attracted by the metal drum electrode 5, and fall into the second separation container 9 due to the rotation of the metal drum electrode 5 or fall into the second separation container 9 when they are scraped off the surface of the metal drum electrode 5 with the brush 10. On the other hand, the plastic pieces 1 that have been charged with a positive charge, that is, a charge that is opposite to that of the metal drum electrode 5, adhere to the surface of the metal drum electrode 5, and fall into the first separation container 8 due to the centrifugal forces of the metal drum electrode 5.

The conventional frictional charging device 3 agitates and frictionally charges the plastic pieces 1 comprised of a plurality of different type resin plastics that have been introduced into the hopper 2, but when there is a large difference between the different type plastic pieces 1 in amount (that is, a difference in surface area), the plastic pieces 1 may not be imparted, during agitation, with necessary polarity and amount of charge (charge voltage) for electrostatical separation. In such a case, it was not possible to sufficiently sort the plastic pieces 1 with the metal drum electrode 5 or the high-voltage electrode 6 using the charges on the plastic pieces 1.

It is thus an object of the present invention to provide a plastic sorting method and a plastic sorting apparatus, with which the above-described problems can be solved.

DISCLOSURE OF THE INVENTION

To solve these problems, the present invention provides an apparatus and a method, wherein, if the proportion of the specified plastic pieces to be recovered is very low, then the frictional charging is performed after adding more of the specified plastic pieces, or the same type of plastic pieces, or plastic pieces located in the middle of the charging order of the mixed plastic pieces, or plastic pieces located on the positive or the negative side in a predetermined charging order as an auxiliary frictional charging material, and the added auxiliary frictional charging material remains in the frictional charging device and is used repeatedly.

With this configuration, even if there is relatively little auxiliary frictional charging material, the charging can be performed with an adequate polarity and amount of charge, so that the specified plastic pieces can be separated and recovered with high purity and recovery rate. Furthermore, it is economic, because the auxiliary frictional charging material can be used several times.

In another aspect of the present invention, if the proportion of the specified plastic pieces to be recovered is very low, the same effect can be attained by a special design of the frictional charging device, instead of adding the specified plastic as the auxiliary frictional charging material. That is to say, the frictional charging device is configured of a substantially cylindrical container, a plurality of agitating rod members that are attached in radial fashion to a rotation shaft rotating about the center of the container, and a plurality of auxiliary agitation members that are fixed to an inner container and arranged between the agitating rod members. The plastic sorting method and the plastic sorting apparatus are also characterized in that the surface area of the agitating rod members and the auxiliary agitation members is no less than 10% of the total surface area of the plastic pieces that are introduced into the frictional charging device at one time.

With this configuration, the agitating rod members and the auxiliary agitation members function as auxiliary frictional charging material and each type plastic piece is charged with a predetermined polarity and amount of charge, so that plastic pieces of intended types can be separated and recovered with high purity and recovery rate.

BEST MODE FOR CARRYING OUT THE INVENTION

The following is an explanation of the preferred embodiments of the invention, with reference to accompanying drawings. In a first embodiment of the present invention, the plastic sorting apparatus S includes a hopper 2 into which a mixture of a plurality of plastic pieces (crushed waste to be sorted) 1 comprised of different type resins is introduced; a frictional charging device disposed on the side of an outlet port 2a of the hopper 2 and used for agitating and frictionally charging the plastic pieces 1; an electrostatic separation unit G for electrostatically separating the various types of plastic pieces 1 that have been frictionally charged, the electrostatic separation unit G being disposed below the frictional charging device 3; and a first separation container 8 and a second separation container 9 for recovering the plastic pieces 1 that have been electrostatically separated by the electrostatic separation unit G. according to polarity and amount of charge (that is, according to type) of each plastic piece.

Figure 2:
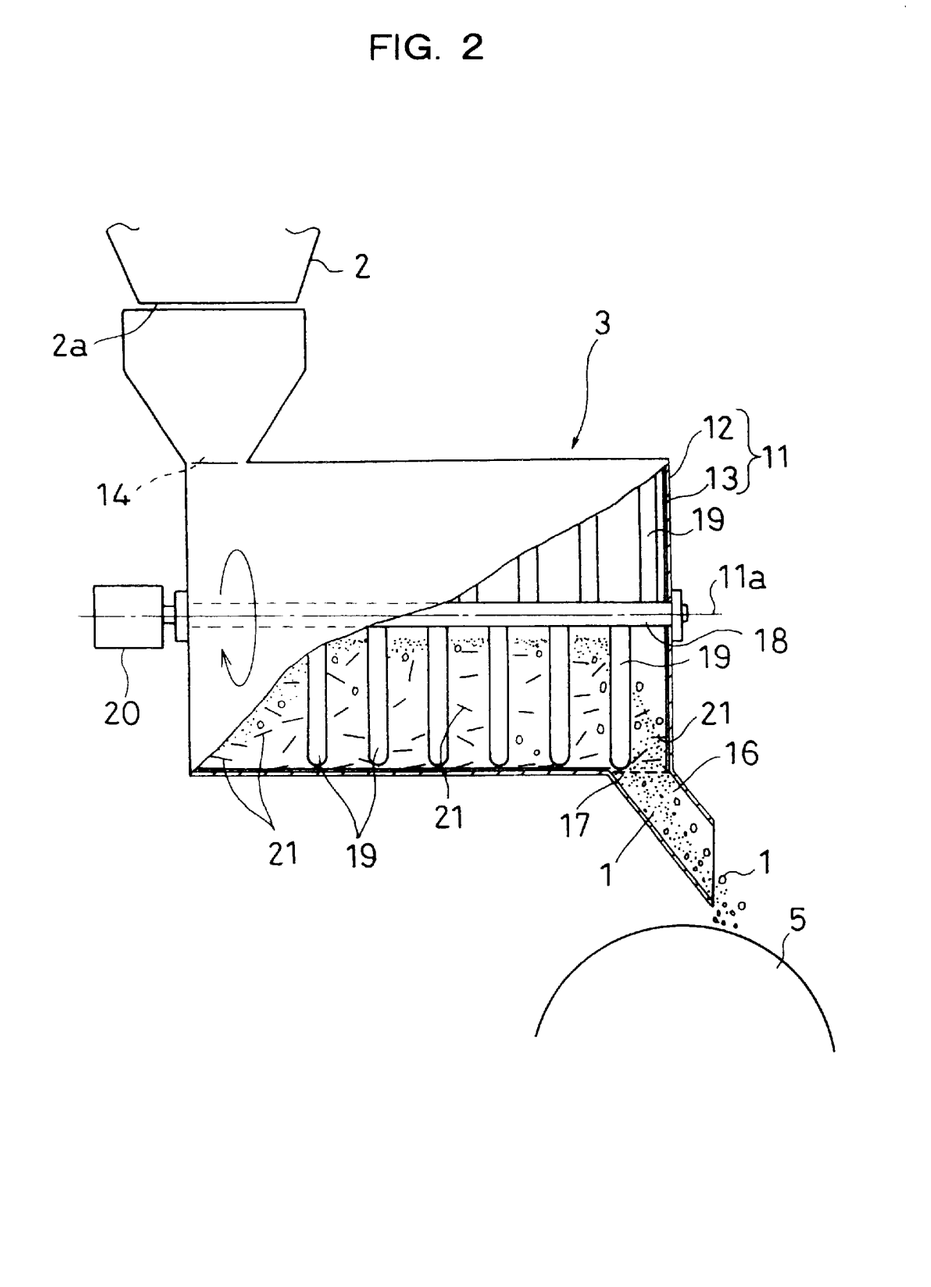
FIG. 2 is a broken-away diagram showing a configuration of a frictional charging device according to the same embodiment.

FIG. 2 shows the detailed configuration of the frictional charging device 3. The frictional charging device 3 includes a container 11 connected to the outlet port 2a of the hopper 2. The container 11 has a double structure for preventing the charges generated in the container from being discharged to the outside. The container 11 includes a cylindrical outer container 12 on the outside and a cylindrical inner container 13 provided concentrically with the outer container 12 inside the outer container 12. An intake port 14 that is connected to the outlet port 2a of the hopper 2 is formed on an upper wall on one side of the container 11. An unloading port 16 through which the plastic pieces 1 are unloaded is formed on the lower wall on the other side of the of the container 11. A net 17, which keeps auxiliary frictional charging material 21 (explained below) inside the container 11, is spread out over this unloading port 16.

A rotation shaft 18 is inserted along the center axis 11a of the container 1. Metal agitating rod members 19 for agitating the various types of plastic pieces 1 that have been introduced into the container 11 from the hopper 2 are attached in radial fashion to the peripheral surface of the rotation shaft 18. A driving motor 20 for rotating the rotation shaft 18 is attached to the outside of the container 11.

The following is an explanation of the configuration of the electrostatic separation device G, with reference to FIG. 1. The electrostatic separation device G includes a metal drum electrode 5 disposed below the unloading port 16 of the container 11; a high-voltage electrode 6 disposed diagonally above the metal drum electrode 5; and a brush 10 provided below the metal drum electrode 5 for scraping off plastic pieces 1 that adhere to the peripheral surface of the metal drum electrode 5. The metal drum electrode 5 is rotatable in a predetermined direction around its horizontal axis, and is grounded. A negative electrode of a high-voltage power source 7 is connected with the high-voltage electrode 6, whereas a positive electrode of the high-voltage power source 7 is grounded. Being thus connected, the metal drum electrode forms a rotating grounded electrode, and an electrostatic sorting field is generated between the high-voltage electrode 6 and the metal drum electrode 5.

The first separation container 8 and the second separation container 9 are provided in order below the metal drum electrode 5 in the rotating direction of the metal drum electrode 5, and both the first separation container 8 and the second separation container 9 are. open upward.

The following is an explanation of a plastic sorting method using a plastic sorting apparatus S with this configuration. Various types of plastic pieces 1 that have been crushed to about 3 mm size are introduced in a mixed state into the frictional charging device 3 from the hopper 2. By driving the driving motor 20, the plastic pieces 1 are agitated by the agitating rod members 19, and charged either positively or negatively depending on the charging order of the plastic types. Then, when the various types of plastic pieces 1 have been introduced into the hopper 2 and frictional charging is performed, if the amount of specific plastic pieces 1 (for example PVC) to be collected is small, then a predetermined amount of these specific plastic pieces 1 is added as auxiliary frictional charging material 21. The added auxiliary frictional charging material 21 has a larger surface area (larger diameter) than the other plastic pieces 1.

Then, when the various types of mixed plastic pieces 1 that have been introduced into the frictional charging device 3 are agitated inside the inner container 13, the agitation causes friction between the plastic pieces 1, between-plastic pieces 1 and agitating rod members 19, between plastic pieces 1 and the auxiliary agitation member 27, and between plastic pieces 1 and the inner container 13. By adding the auxiliary frictional charging material 21 to the plastic pieces 1, each type of the plastic pieces 1 is adequately frictionally charged with a predetermined amount of charge and polarity, and the frictionally charged plastic pieces 1 are passed through the holes of the net 17 and scattered onto the metal drum electrode 5. The added auxiliary frictional charging material 21, however, has a larger surface area (larger diameter) than the other plastic pieces 1, so that it does not fall through the holes of the net 17 but remains inside the container 11.

Then, the plastic pieces 1 that have been charged with a negative charge in the frictional charging device 3 are repelled by the high-voltage electrode 6 and attracted to the metal drum electrode 5, and fall into the second separation container 9 due to the rotation of the metal drum electrode 5 or fall into the second separation container 9 when they are scraped off the surface of the metal drum electrode 5 by the brush 10.

The plastic pieces 1 that have been charged with a positive charge, that is, opposite to the polarity of the high-voltage electrode 6, are attracted to. the surface of the high-voltage electrode 6 and fall into the first separation container 8 due to the rotation of the metal drum electrode 5. Consequently, specified plastic pieces 1 can be collected from a mixture of various types of plastic pieces 1.

Then, when subsequent plastic sorting is performed, the added auxiliary frictional charging material 21 remains inside the container 11, so that it is unnecessary to add auxiliary frictional charging material 21. The auxiliary frictional charging material 21 in the frictional charging device 3 is reused, and plastic pieces 1 of different types are rubbed against one another in the frictional charging device 3, as describe above, so that each type of the plastic pieces 1 can be frictionally charged with a predetermined polarity and amount of charge (charge voltage), and the plastic pieces 1 can be reliably separated by the electrostatic separation unit G so as to be separated and recovered in the first separation container 8 and the second separation container 9.

Arrangement array of the materials, namely PP, PE, PVC, PS and PET, which can be recovered for relatively a large amount, may be as follows, as conventionally known, PS, PE, PP, PET and PVC in the order of more easily being charged positively.

Selecting PP, which is located in the middle of this charging order, as a reference plastic material, and rubbing other plastic materials against this PP reference plastic material, both PS and PE are charged positively, with PS being more so than PE. PP is hardly charged at all. PET and PVC are charged negatively, with PVC being more so than PET. Thus, taking a plastic that is located at an intermediate position in this charging order as the reference plastic material, the mixed plastic pieces 1 can be frictionally charged to a predetermined polarity and amount of charge for each type.

Figure 3:
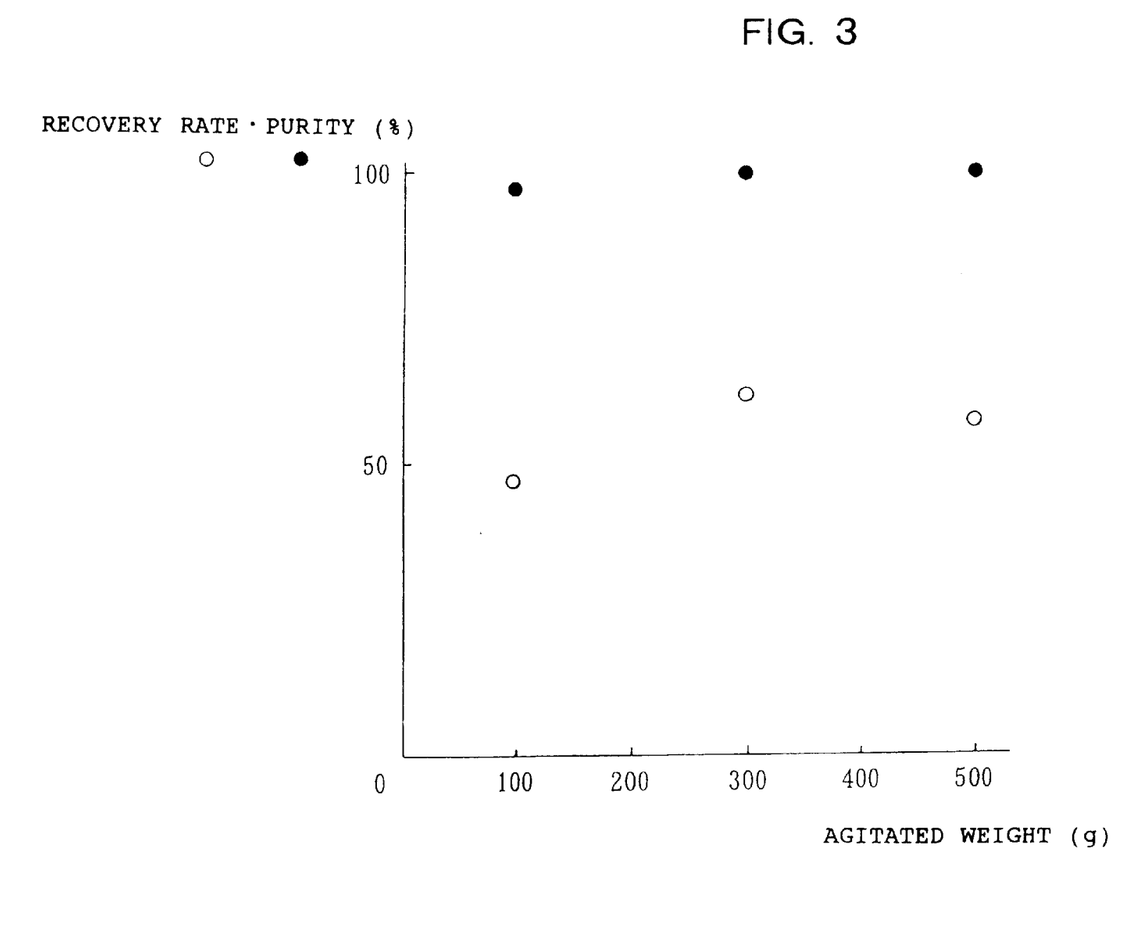
FIG. 3 is a graph showing a relation between agitated weight of plastic pieces and recovery rate/purity of the plastic pieces.

Using the plastic pieces 1 of PE, PP, PS, PET and PVC, experiments were performed regarding recovery rate and recovery purity. In these experiments, weight proportion of these plastic pieces was set as

PE:PP:PS:PET:PVC=4:2:2:1:1 and a total weight W of the plastic pieces 1 (agitated weight) was set to be 100 to 500 g each time. The results of these experiments are shown in FIG. 3. This graph shows the recovery rate and recovery purity of the plastic pieces 1 after PVC has been separated and recovered, that is, of PE, PP, PS and PET. As is clear from this graph, with the above-noted weight proportion, the purity (indicated by ●) is higher than 90%, while the recovery rate (indicated by ○) is relatively low at 50%.

Figure 4:
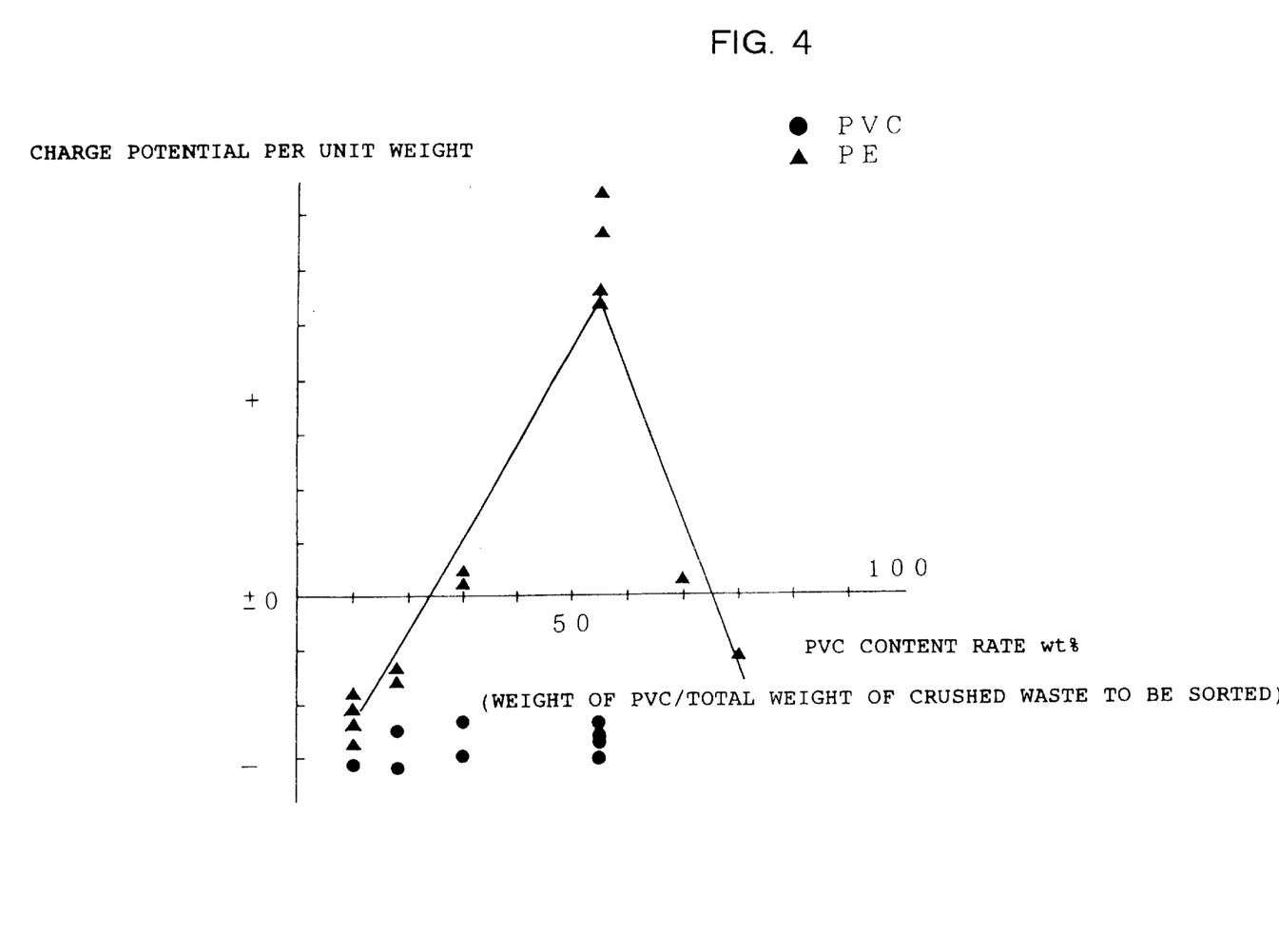
FIG. 4 is a graph showing a relation between a content rate of PVC and a charge potential per unit weight.

In order to elucidate the reasons for this low recovery rate, charge potentials of PVC and PE were determined, after having frictionally charged the mixture of the five types of plastic pieces 1. FIG. 4 shows the results when the proportion of the four types other than PVC, that is, PE, PP, PS and PET, were kept at the same proportion, and only the proportion of PVC was varied. When the content weight of PVC accounted for not more than 20 wt % or not less than 80 wt %, it was clarified that if PP is selected as a reference plastic material and the other plastic materials are rubbed against one another, as mentioned above, the polarity of PE which is charged positively in the charging order becomes negative like PVC.

When the polarity of PE is negative as that of the PVC, the separation ability of the electrostatic separation unit G worsens when trying to separate PVC as the specified plastic pieces 1 from the other plastic pieces 1.

In order to examine how the recovery rate and purity of the other plastics change when the proportion of the specified plastic pieces 1 is changed by adding auxiliary frictional charging material, an experiment was performed with plastic pieces 1 of 3 mm size, auxiliary frictional charging material of 6 mm diameter and a net M with 5 mm holes.

Figure 5:
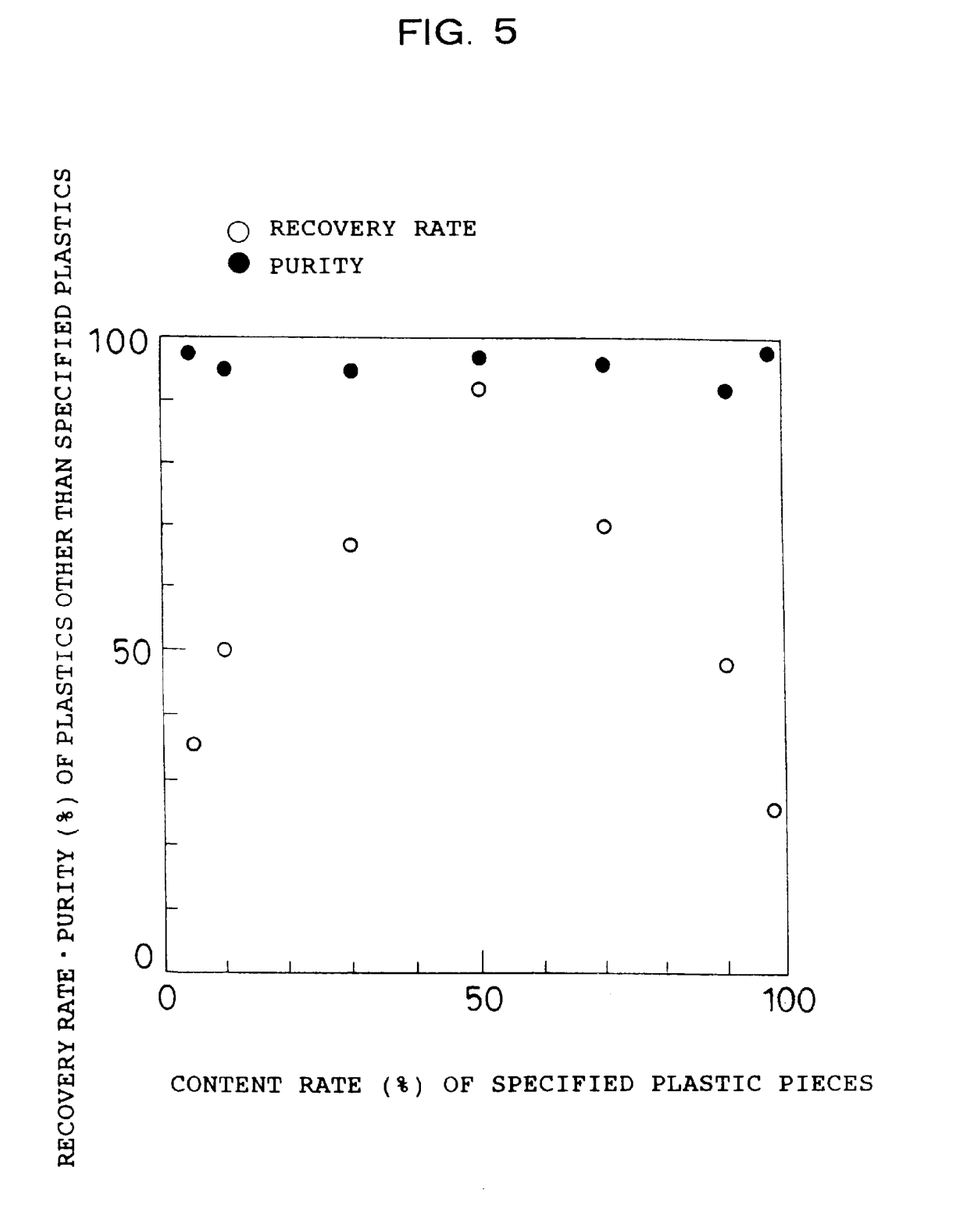
FIG. 5 is a graph showing a relation between the content rate and the recovery rate/purity of specified plastic pieces.

In the first embodiment, experiments were carried out, changing R=(Wt+Wm)/W, wherein Wt is the weight of the specified plastic pieces 1, Wm is the weight of the added auxiliary frictional charging material 21, and W is the total weight of the plastic pieces 1 including the auxiliary frictional charging material 21 introduced into the frictional charging device 3. The results are shown in FIG. 5. In this graph, the horizontal axis marks R which denotes content rate of the specified plastic pieces including the auxiliary frictional charging material inside the frictional charging device, and the vertical axis marks the recovery rate and purity of the other plastics excluding the specified plastic in the separation containers. This graph shows that the recovery rate is at least about 50% when the content rate of the specified plastic pieces including the auxiliary frictional charging material is about 10 to 90%. Especially, when the content rate is around 50%, separation is possible with a recovery rate of more than 90%. After the separation, the purity is consistently higher than 90% for every content rate.

It is envisaged that by adding a sufficient amount of PVC as auxiliary frictional charging material 21 according to the above-noted equation, the charging polarities of PVC and PE after having been frictionally charged in the frictional charging device 3 become clearly opposite to each other (that is, PVC negative and PE positive as in the charging order), and the necessary polarity and amount of charge for separation of the various types of plastics, 1 could be imparted. It seems also possible that when PET is also charged negatively in the charging order like PVC, it may also fall into the second separation container 8, but this can be taken care of by changing the voltage for applying the electrostatic sorting field.

Incidentally, FIG. 5 also shows that in the range of R=0.1 to 0.9, the purity assumes consistently high values of more than 90%. Consequently, to achieve a recovery with high purity, it is suitable that R=0.1 to 0.9. However, it can be seen that moving away from the value R=0.5, the recovery rate decreases. For example, at R=0.1 and R=0.9, the recovery rate is only 50%.

However, this can be compensated by repeating the above-described separation process several times. That is to say, the recovery rate can be improved by separating the other plastic pieces 1 mixed into the specified plastic pieces 1 by reusing the auxiliary frictional charging material 21 remaining in the frictional charging device 3 as it is and again agitating and frictionally charging the specified plastic pieces 1 for which the separation process has been performed once.

For example, assuming that the recovery rate of PVC (specified plastic pieces 1) which has been subjected once to the separation process is 50% and this PVC is mixed with about 50% of other plastic pieces 1, the remaining auxiliary frictional charging material 21 was reused as it is for re-agitating and frictionally charging the specified plastic pieces 1 into which about 50% of other plastic pieces 1 have been mixed. As a result, 70% recovery rate was attained. Also in this case, of course, the purity was high enough as being no less than 90%. When the auxiliary frictional charging material 21 is reused, the specified plastic pieces 1 can be set to a predetermined polarity and amount of charge by introducing other plastic pieces 1 to the frictional charging device 3 depending on the amount of the remaining auxiliary frictional charging material 21. Thus, a high recovery rate can be attained by repeating the above-described electrostatic separation process several times.

In this manner, according to the first embodiment of the present invention, when there are only a few specified plastic pieces 1 (such as PVC) to be recovered, by adding to the frictional charging device 3 and agitating therein the specified plastic pieces 1 as an auxiliary-frictional charging material 21, it becomes possible that different types of plastic pieces 1 are prevented from being charged with a same polarity while being applied with different amounts of charge, so that the specified plastic pieces 1 can be reliably separated with the electrostatic separation unit G and therefore be recovered.

The container 11 and the agitating rod members 19 of the frictional charging device 3 are usually made of metal, for the reasons of productivity, safety with respect to charging, and stability of the charging properties of the plastic pieces 1. In this case, PE and PP were charged negatively like PVC, and it used to be difficult to recover PVC, but according to the first embodiment of the present invention, the polarity and amount of charge of the plastic pieces 1 to be recovered are caused to be different from those of the other plastic pieces by adding to the frictional charging device 3 and agitating therein the specified plastic pieces 1 as the auxiliary frictional charging material 21, so that even when the container 11 and the agitating rod members 19 of the frictional charging device 3 are made of metal, the specified plastic pieces 1 can be reliably separated with the electrostatic separation unit G. applied with a predetermined polarity and amount of charge depending on each plastic type, and therefore reliably recovered.

According to this first embodiment, in order to improve the recovery rate, the plastic pieces 1 were agitated repeatedly to be frictionally charged, by reusing the remaining auxiliary frictional charging material 21 in the frictional charging device 3 as it is. However, there is no limitation to this. The same operation effect as that of the above-described first embodiment can also be obtained as follows: when agitating the plastic pieces 1 again, they may be removed from the frictional charging device 3, fed into the hopper together with other plastic pieces 1, and agitated in the frictional charging device 3 so as to be frictionally charged, so that a predetermined polarity and amount of charge may be applied to each type plastic pieces 1.

Moreover, according to this first embodiment, if the amount of the specified plastic pieces 1 to be recovered is small when a plurality of types of plastic pieces 1 are introduced into the hopper 2 to perform charging, a predetermined amount of these specified plastic pieces 1 was added as auxiliary frictional charging material 21. However, there is no limitation to this. It is also possible to attain the same operational effect as that of the first embodiment by adding a predetermined amount of the same type of plastic pieces 1 as the specified plastic pieces 1 to be recovered, or plastic pieces 1 located in the middle of the charging order of the mixed plastic pieces 1, or plastic pieces located on the positive or the negative side in a predetermined charging order, as the auxiliary frictional charging material 21.

Figure 6:
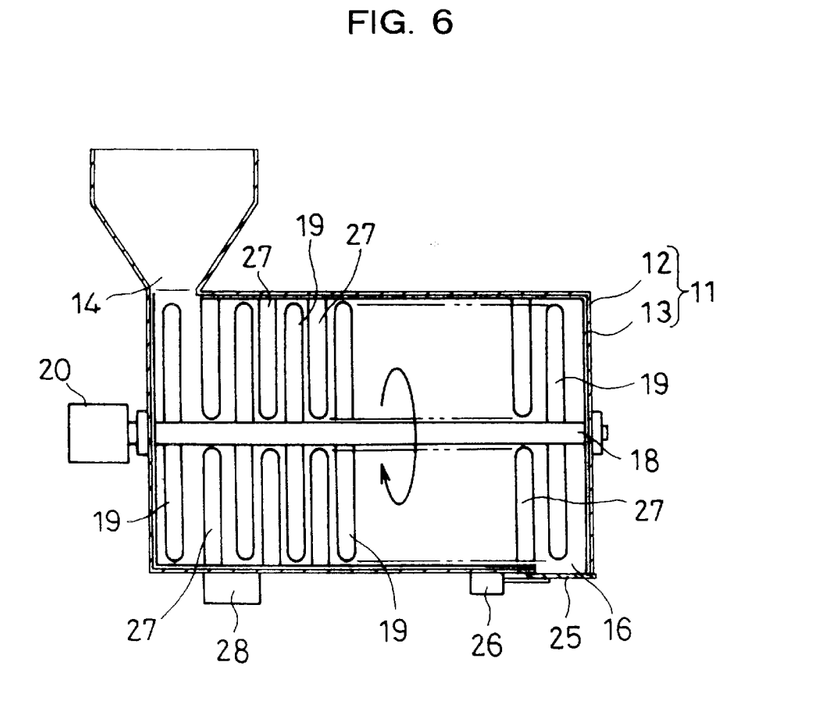
FIG. 6 is a lateral cross-sectional view of a frictional charging device according to a second embodiment of the present invention.
Figure 7:
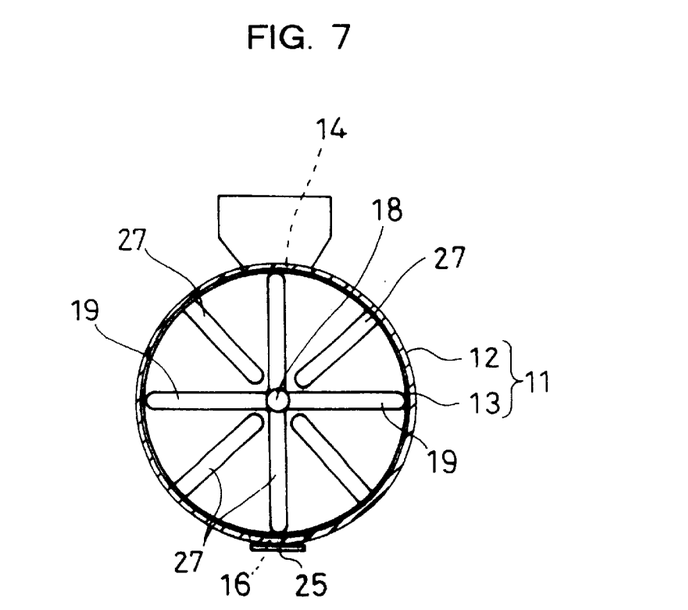
FIG. 7 is a front section of the same frictional charging device.

Based on FIGS. 6 and 7, the following is an explanation of a second embodiment of the present invention. In the plastic sorting apparatus S according to the second embodiment of the present invention, the frictional charging device 3 includes a double structure container 11 connected to an outlet port 2a of the hopper 2. The container 11 includes a cylindrical outer container 12 on the outside and a cylindrical inner container 13 arranged inside and concentrically with the outer container 12. An intake port 14 that is connected to the outlet port 2a of the hopper 2 is formed in the upper wall on one side of the container 11. An unloading port 16 through which the plastic pieces 1 are unloaded is formed in the lower wall on the other side of the of the container 11 and can be opened and closed with a shutter 25. An open/close cylinder device 26 is provided for opening and closing the shutter 25.

A rotation shaft 18 is provided along the center axis of the container 11. Metal agitating rod members 19 for agitating the various types of plastic pieces 1 that have been introduced to the container 11 from the hopper 2 are attached in radial fashion at a plurality of locations along the rotation shaft 18 to the peripheral surface of the rotation shaft 18. A driving motor 20 for rotating the rotation shaft 18 is attached to the outside of the container 11. In addition, auxiliary agitation members 27 extend in reverse radial fashion between the agitating rod members 19 from the inner wall of the inner container 13 towards the rotation shaft 18.

The agitating rod members 19 and the auxiliary agitation members 27 replace the auxiliary frictional charging material 21 that has been added in the above-described first embodiment, so that the total surface area of the agitating rod members 19 and the auxiliary agitation members 27 is set to correspond to the total surface area of the auxiliary frictional charging material 21 determined by $$R=(Wt+Wm)/W=0.1 \text{ to } 0.9$$

in the first embodiment.

The frictional charging device 3 includes a vibrator 28 for imparting a vibration on the container 11, attached to the lower wall of the container 11. Other aspects of the plastic sorting apparatus S are the same as those in the first embodiment, so that there description has been omitted here.

The following is an explanation of a plastic sorting method with the plastic sorting apparatus S according to the second embodiment of the present invention. As in the first embodiment, various types of crushed plastic pieces 1 are introduced in a mixed state from the hopper 2 into the frictional charging device 3 and are agitated by driving the driving motor 20. Then, the various types of plastic pieces 1 that have been introduced into the frictional charging device 3 are agitated and frictionally charged inside the inner container 13 by other plastic pieces 1, by the agitating rod members 19 and by the auxiliary agitation members 27.

Because the frictional charging device 3 is provided with auxiliary agitation members 27 having a surface area that corresponds to the total surface area of the auxiliary frictional charging material 21 in the first embodiment, the plastic pieces 1 are frictionally charged to a predetermined polarization and charge for each type of the plastic pieces 1.

Then, due to the activation of the vibrator 28 (alternatively, it is also possible to tilt the container 11 instead of attaching a vibrator), the frictionally charged plastic pieces 1 fall from the unloading port 16 onto the electrostatic separation unit G. The plastic pieces 1 that have been charged with a negative charge in the frictional charging device 3 are repelled by the high-voltage electrode 6 and attracted to the metal drum electrode 5, and fall into the second separation container 9 due to the centrifugal forces of the metal drum electrode 5 or are scraped off and separated from the surface of the metal drum electrode 5 with the brush 10 and fall into the second separation container 9. On the other hand, the plastic pieces 1 that have been charged with a positive charge by the frictional charging device 3, that is, opposite to the charge of the metal drum electrode 5, are attracted to the surface of the high-voltage electrode 6 and fall into the first separation container 8 due to the rotation of the metal drum electrode 5, and can thus be separated and recovered.

According to the second embodiment of the present invention, the frictional charging device 3 is provided with agitating rod members and auxiliary agitation members 27 having a surface area that corresponds to the total surface area of the auxiliary frictional charging material 21 in the first embodiment, and the agitation with the auxiliary agitation members 27 frictionally charges the plastic pieces 1 to a predetermined polarization and charge for each type of the plastic pieces 1. Consequently, it is possible to separate the specified plastic pieces 1 from the other plastic pieces 1 with high recovery rate and high purity in the electrostatic separation unit G. The other operational effects are the same as those in the first embodiment.

As becomes clear from the above explanations, if the amount of specified pieces to be recovered is small, the present invention adds a predetermined amount of any of these specified plastic pieces, or the same type of plastic pieces, or plastic pieces located in the middle of the charging order of the mixed plastic pieces, or plastic pieces located on the positive or the negative side in a predetermined charging order, as the auxiliary frictional charging material 21 as an auxiliary frictional charging material when introducing the various types of plastic pieces into the frictional charging device, whereby different types of plastic pieces can be charged with a predetermined polarity and amount of charge for each type of the plastic pieces, so that the separation with the electrostatic separation unit can be carried out reliably, the specified plastic pieces can be recovered reliably, and the added auxiliary frictional charging material can be left in the frictional charging device and used repeatedly.

Especially, when the weight Wt of the specified plastic pieces, the weight Wm of the added auxiliary frictional charging material, and the total weight Wt of the mixed plastic pieces including the auxiliary frictional charging material introduced into the frictional charging device are set to satisfy the relation (Wt+WM)/W=0.1 to 0.9, if the recovery rate of the specified plastic pieces has become low, the recovery rate can be increased by performing the frictional charging and electrostatic separation process several times.

Moreover, the auxiliary agitation members whose surface area corresponds to the surface area of the auxiliary frictional charging material as introduced by the above equation agitate the plastic pieces inside the frictional charging device such that a predetermined polarity and amount of charge is applied to each type of the plastic pieces, so that the separation and recovering of the specified pieces can be carried out with high purity and high recovery rate.

What is claimed is:

1. A plastic sorting method, in which plastic pieces (1) comprising a plurality of types of plastic pieces which have been crushed into a granular shape and mixed together are introduced into and agitated in a frictional charging device (3) so that the plastic pieces (1) are frictionally charged with a polarity and amount of charge that correspond to the types of plastic pieces, and then a specified type of plastic piece (1) is recovered by collecting the plurality of types of plastic pieces (1) with an electrostatic separation unit (G) in separate separation containers depending on polarity and amount of charge, the plastic sorting method being characterized in that:

in the frictional charging device (3), the plastic pieces (1) are agitated and frictionally charged in a container (11) by the relative motion between a plurality of agitating rod members (19) that are radially attached to a rotation shaft (18) rotating about the center of the container (11) and a plurality of auxiliary agitation members (27) that are fixed to an inner container (13) and arranged between the agitating rod members (19); and the surface area of the agitating rod members (19) and the auxiliary agitation members (27) is at least 10% of the total surface area of the plastic pieces (1) that are introduced into the frictional charging device (3) at one time.

2. A plastic sorting apparatus comprising: a frictional charging device (3) for agitating and frictionally charging plastic pieces (1) comprising a plurality of types of plastic pieces which have been crushed into a granular shape and mixed together with a predetermined polarity and amount of charge for each type of the plastic pieces; an electrostatic separation unit (G) for separating the frictionally charged plastic pieces (1) below an unloading aperture (16) of the frictional charging device (3); and separation containers (8, 9) for separately recovering the plastic pieces that have been separated with the electrostatic separation unit (G), depending on polarity and amount of charge, the plastic sorting apparatus being characterized in that:

the frictional charging device (3) comprises a substantially cylindrical container (11), a plurality of agitating rod members (19) that are radially attached to a rotation shaft (18) rotating about the center of the container, and a plurality of auxiliary agitation members (27) that are fixed to an inner container (13) and arranged between the agitating rod members (19); and the agitating rod members (19) and the auxiliary agitation members (27) have a surface area of no less than 10% of the total surface area of the plastic pieces (1) that are introduced into the frictional charging device (3) at one time.

* * * * *